United States Patent
Huber-Emden et al.

[11] 3,856,849
[45] Dec. 24, 1974

[54] CARBOXYLIC ACID PERFLUOROALKYL ESTERS

[75] Inventors: Helmut Huber-Emden, Basel; Paul Schafer, Riehen, both of Switzerland

[73] Assignee: Ciba-Geigy Corporation, Ardsley, N.Y.

[22] Filed: Oct. 17, 1973

[21] Appl. No.: 407,397

[30] Foreign Application Priority Data
Oct. 18, 1972   Switzerland...................... 15243/72

[52] U.S. Cl........... 260/486 H, 117/139.5, 117/142, 117/148, 252/56, 260/80.73, 260/86.1 R, 260/86.1 E, 260/86.3, 260/86.7, 260/485 F, 260/633
[51] Int. Cl............................................ C07c 69/54
[58] Field of Search ..................... 260/486 H, 485 F

[56] References Cited
UNITED STATES PATENTS
3,457,247   7/1969   Katsushima et al............. 260/486 H
3,514,420   5/1970   Katsushima et al............. 260/486 H

*Primary Examiner*—Lorraine A. Weinberger
*Assistant Examiner*—Paul Killos
*Attorney, Agent, or Firm*—Joseph G. Kolodny; Edward McC. Roberts; Prabodh Almaula

[57] ABSTRACT

Carboxylic acid perfluoroalkyl esters of the formula

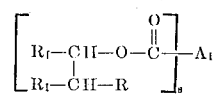

wherein $R_f$ is a perfluorinated hydrocarbon radical with 1 to 22 carbon atoms, R is hydrogen or methyl, $R_1$ is chlorine, unsubstituted or substituted phenyl or an alkoxy radical, $A_1$ is a hydrocarbon radical with 2 or 3 carbon atoms derived from monobasic, dibasic or tribasic ethylenically unsaturated carboxylic acids and $s$ is an integer from 1 to 3, and their polymerisation products are provided. The new esters and their polymerisation products are useful for rendering porous or non-porous substrates oil-, water- and dirt-repellent or to provide soil-release- anti soiling finishes.

7 Claims, No Drawings

CARBOXYLIC ACID PERFLUOROALKYL ESTERS

The present invention relates to carboxylic acid perfluoroalkyl esters corresponding to the formula (1) 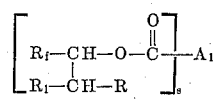

wherein $R_f$ represents a perfluorinated hydrocarbon radical with 1 to 22 carbon atoms, R represents hydrogen or methyl, $R_1$ represents chlorine or the radical $R'_1$-O-, in which $R'_1$ represents alkyl with 1 to 12 carbon atoms, cycloalkyl with 5 or 6 ring carbon atoms, alkoxyalkyl with 2 to 10 carbon atoms, the radical $-(CH_2CH_2O)_n-R'$, in which $R'$ represents alkyl with 1 to 6 carbon atoms and $n$ is 1 or 2, or represents an optionally substituted phenyl radical, $A_1$ represents a hydrocarbon radical with 2 or 3 carbon atoms that is derived from monobasic, dibasic, or tribasic ethylenically unsaturated carboxylic acids, and $s$ is a whole number from 1 to 3.

The invention relates also to the polymerisation products that can be manufactured from the compounds of the formula (1).

The perfluorinated hydrocarbon radical in formula (1) is preferably a straight-chain or branched perfluoroalkyl radical with 4 to 17 carbon atoms and can correspond more or less to the following formulae:

$F(CF_2)_p-$   $p = 4-17$
$(CF_3)_2CF(CF_2)_q-$   $q = 1-14$
$CF_3[CF_2CF(CF_3)]_r-$   $r = 1-4$
$(CF_3)_2CF[CF_2CF(CF_3)]_s-$   $s = 1-3$

ω-H-perfluoroalkyl radicals are also possible.

The radical $R'_1$ can be a straight-chain or branched alkyl radical with 1 to 12 carbon atoms, e.g. methyl, ethyl, propyl, isopropyl, butyl, hexyl, octyl, isooctyl, decyl or dodecyl; also it can be a cyclopentyl or cyclohexyl radical or an alkoxyalkyl radical, such as $-CH_2CH_2OCH_3$, $-CH_2CH_2OC_2H_5$, $-CH_2CH_2OC_4H_9$, $-CH_2CH_2OC_6H_{13}$, $-CH_2CH_2OC_8H_{17}$; furthermore it can be an alkoxyethoxyethyl radical of the formula $-(CH_2CH_2O)_n-R''$, in which $R''$ represents alkyl with 1 to 6 carbon atoms and $n$ is 1 or 2, or a phenyl radical or an alkyl-substituted phenyl radical or an alkyl-substituted phenyl radical with 1 to 4 carbon atoms in the alkyl chain.

Preferably the carboxylic acid perfluoroalkyl esters correspond to the formula (2) 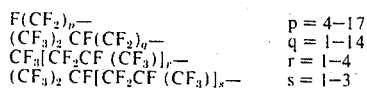

wherein R represents hydrogen or methyl, $R_2$ represents chlorine or the radical $R'_2$-O, in which $R'_2$ represents alkyl with 1 to 6 carbon atoms, cyclohexyl, phenyl, or alkoxyalkyl with 1 to 3 carbon atoms in the alkoxy moiety, $A_2$ represents an ethylenically unsaturated hydrocarbon radical that is derived from acrylic, methacrylic, crotonic, vinylacetic, fumaric, maleic, citraconic, mesaconic, aconitic, or methylenemalonic acid, $n$ is a whole number from 4 to 14, and $s$ is a whole number from 1 to 3.

Compounds of particular interest are those of the formula (3) 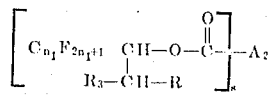

and especially (4) 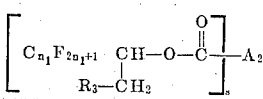

wherein R represents hydrogen or methyl, $R_3$ represents chlorine or the radical $R'_3$-O-, in which $R'_3$ represents alkyl with 1 to 6 carbon atoms, cyclohexyl, phenyl, or methoxyethyl, $n_1$ is a whole number from 6 to 12, and $A_2$ and s have the indicated meanings.

When $s = 1$ there are obtained the acrylic and methacrylic acid derivatives of the formulae (5) 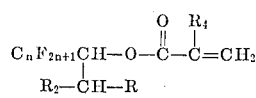

and (6) 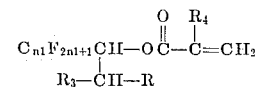

wherein $R_4$ represents hydrogen or the methyl radical and R, $R_2$, $R_3$, $n$, and $n_1$ have the indicated meanings.

The carboxylic acid perfluoroalkyl esters are manufactured by reacting perfluoroalcohols of the formula (7) 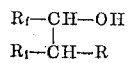

wherein $R_f$ represents a perfluorinated hydrocarbon radical with 1 to 22 carbons, R represents hydrogen or methyl, $R_1$ represents chlorine or the radical $R'_1$-O-, in which $R'_1$ represents alkyl with 1 to 12 carbon atoms, cycloalkyl with 5 or 6 ring atoms, alkoxyalkyl with 2 to 10 carbon atoms, the radical $-(CH_2CH_2O)_n-R'$, in which $R'$ represents alkyl with 1 to 6 carbon atoms and $n$ is 1 or 2, or represents an optionally substituted phenyl radical, with derivatives of carboxylic acids of the formula $A_1(COOH)_s$   8.

wherein $A_1$ represents an ethylenically unsaturated radical with 2 or 3 carbon atoms and $s$ is a whole number from 1 to 3.

The perfluoroalcohols of the formula (7) can be obtained e.g. by hydrolysis according to the following reaction:

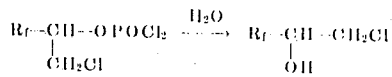

or by alcoholysis according to the following reaction:

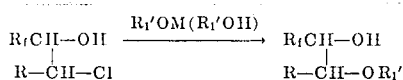

Perfluoroalcohols containing straight-chain or branched perfluoroalkyl radicals with 4 to 17 carbon atoms are preferably used for this esterification. If appropriate, it is also possible to use mixtures of perfluoroalcohols with perfluoroalkyl chains of different length. These mixtures are formed when the starting materials for the manufacture of the perfluoroalcohols are manufactured by telomerisation processes.

Particularly suitable perfluoroalcohols for the present esterification are those that correspond to the formula (9) 

wherein R represents hydrogen or methyl, $R_2$ represents chlorine or the radical $R'_2$-O-, in which $R'_2$ represents alkyl with 1 to 6 carbon atoms, cyclohexyl, phenyl, or alkoxyalkyl with 1 to 3 carbon atoms in the alkoxy moiety, and $n$ is a whole number from 4 to 14.

Particularly suitable are also the perfluoroalcohols of the formula

(10) 

and

(11) 

wherein R represents hydrogen or methyl, $R_3$ represents chlorine or the radical $R'_3$-O-, in which $R'_3$ represents alkyl with 1 to 6 carbon atoms, cyclohexyl, phenyl, or methoxyethyl, and $n_1$ is a whole number from 6 to 12.

The acid derivatives used in the esterification reaction are derived from unsaturated acids of the formula $A_2(COOH)_s$  12.

wherein $A_2$ represents an ethylenically unsaturated hydrocarbon radical that is derived from acrylic, methacrylic, crotonic, vinylacetic, fumaric, maleic, citraconic, mesaconic, itaconic, aconitic, or methylenemalonic acid, and $s$ is a whole number from 1 to 3. Acrylic acid and methacrylic acid esters of alcohols of the formulae (9) and (10) are particularly suitable compounds. But mention may also be made of fumarates, itaconates, and methylenemalonates.

The perfluoroalcohols are esterified by using preferably acid halides, such as acid chlorides and acid esters, e.g alkyl esters. If appropriate, the esterification is carried out in the presence of inorganic or organic, preferably nitrogen-containing, bases. Tertiary amines, e.g. trimethylaminem triethylamine, tributylamine, pyridine, and dimethyl aniline, are particularly suitable.

In general, the reaction of the acid chlorides with the perfluorinated alcohol is preferred since the former are readily accessible and the esterification proceeds rapidly and at low temperatures. The non-existent maleyl chloride and chloromaleyl chloride are of course the exceptions.

In general a two-step synthesis is necessary when using methylenemalonic esters. Using one of the esterification methods described hereinbefore, the malonic esters are first manufactured and from these are obtained the methylenemalonic esters, for example by condensing the malonic ester with formaldehyde (cf. E. Haworth and W. H. Perkin, J. Chem. Soc. 73, 339-345 (1898).

On account of their vinyl group, the carboxylic acid perfluoroalkyl esters can be homopolymerised or copolymerised with other ethylenically unsaturated copolymerisable compounds.

Homopolymers therefore contain recurring units of the formula

(13) 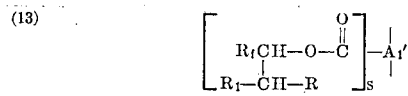

wherein $R_f$ represents a perfluorinated hydrocarbon radical with 1 to 22 carbon atoms, R represents hydrogen or methyl, $R_1$ represents chlorine or the radical $R'_1$-O-, in which $R'_1$ represents alkyl with 1 to 12 carbon atoms, cycloalkyl with 5 or 6 ring carbon atoms, alkoxyalkyl with 2 to 10 carbon atoms, the radical $-(CH_2CH_2O)_n$-$R'$, in which $R'$ represents alkyl with 1 to 6 carbon atoms and $n$ is 1 or 2, or represents an optionally substituted phenyl radical, $A'_1$ represents a hydrocarbon radical with 2 or 3 carbon atoms, and $s$ is a whole number from 1 to 3.

The number of recurring units can be about 10 to 400, which corresponds to a gram-molecular weight range of the polymerisation products of about 5,000 to 230,000.

In accordance with the carboxylic acid perfluoroalkyl esters used, the homopolymers can also contain recurring units of the formula

(14) 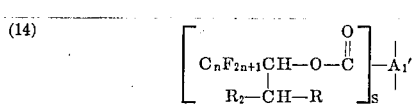

wherein R represents hydrogen or methyl, $R_2$ represents chlorine or the radical $R'_2$-O-, in which $R'_2$ represents alkyl with 1 to 6 carbon atoms, cyclohexyl, phenyl, or alkoxyalkyl with 1 to 3 carbon atoms in the alkoxy moiety, $A'_1$ represents a hydrocarbon radical with 2 or 3 carbon atoms, $n$ is a whole number from 4 to 14, and $s$ is a whole number from 1 to 3.

In addition to the indicated units for the homopolymers, the copolymers contain recurring units of other ethylenically unsaturated copolymerisable compounds.

The polymerisation of the monomeric perfluoroalkyl monocarboxylic acid esters can take place in solution or in emulsion and in the presence of catalysts that generate free radicals with themselves, with another perfluoroalkyl monocarboxylic acid ester, or with other compounds that can be polymerised to linear polymers.

Examples of suitable compounds for the copolymerisation with the perfluoroalkyl monocarboxylic acid esters are:

a. vinyl esters of organic carboxylic acids, e.g. vinyl acetate, vinyl formiate, vinyl butyrate, vinyl benzoate, b. vinyl alkyl ketones and vinyl alkyl ethers, such as vinyl methyl ketone and vinyl butyl ether, c. vinyl halides, such as vinyl chloride, vinyl fluoride, vinylidene chloirde, d. vinylpyrrolidone, e. vinyl aryl compounds, e.g. styrene and substituted styrenes, f. derivatives of the acrylic acid series, e.g. acrylic nitrile or acrylic amide preferably derivatives substituted at the amide nitrogen, e.g. N-methylolacrylamide, N-methylolacrylic amide alkyl ether, N,N-dihydroxyethylacrylic amide, N-tert.butyl-acrylic amide and hexametholylmelamine triacrylic amide, and the corresponding quaternised compounds, g. esters of the acrylic acid series, e.g. esters of acrylic acid, methacrylic acid, α-chloroacrylic acid, crotonic acid, maleic acid, fumaric acid or itaconic acid, and mono- or dialcohols containing from 1 to 18 carbon atoms, or phenols, e.g. ethyl acrylate, glycidyl acrylate, butyacrylate, acrylic acid monoglycol ester, dodecylacrylate, or N-dialkylaminoethylmethacrylate and the corresponding quaternised compound, and h. polymerisable olefins, such as isobutylene, butadiene or 2-chlorobutadiene.

Preferably there are used esters, amides or methylol amides of acrylic or methacrylic acid, such as ethyl acrylate, butyl acrylate, glycidal acrylate, glycolmonoacrylate, also calcium acrylate, acrylic amide, methacrylate, methacrylic amide, N-methylolacrylic amide, N-methylolacrylic amide methyl ether, N-tert.butylacrylic amide; vinyl esters of organic carboxylic acids, such as vinyl acetate; styrene, vinyl halides, such as vinyl chloride or vinylidene chloride; or polymerisable olefins, such as isobutylene, or vinyl pyrrolidone.

The copolymers obtained with the use of these comonomers are particularly suitable as oil-repellents and also for the soil-release finishing.

The polymers are composed as a rule of 5 to 100, preferably of 40 to 98, percent by weight of a carboxylic acid perfluoroalkyl ester and of 95 to 0, preferably 60 to 2, percent by weight of another compound. Particular industrial importance attaches to those bi-, ter- and quaterpolymers that in addition to 40 to 98 percent by weight of the monomer carboxylic acid perfluoroalkyl ester, based on the weight of the monomer, contain a reactive monomer, such as N-methylolacrylic amide, an acrylic ester, such as decylacrylate, and optionally a vinyl ester, such as vinyl acetate.

The manufacture of the polymers by homopolymerisation or copolymerisation of perfluoroalkyl monocarboxylic acid esters with one or more other copolymerisable ethylenically unsaturated monomers is carried out by conventional methods, for example by block polymerisation, bead polymerisation, in aqueous emulsion, or preferably by solvent polymerisation in a solvent suitable for this purpose, e.g. acetone, benzene, sym. dichloroethane, ethyl acetate, or trifluoromethylbenzene.

The polymerisation is effected advantageously with the application of heat, preferably to the boiling temperature of the solvent and accompanied by the addition of catalysts that form peroxidic or other free radicals and are soluble in the reaction medium, e.g. benzoyl peroxide, lauroyl peroxide, α,α'-azoisobutyrodinitrile or potassium peroxide disulphate or redox systems, e.g. potassium peroxide disulphate/sodium bisulphite or ferrosulphate.

Depending on the nature of the polymerisation conditions and of the monomer starting materials used, the polymer compounds are obtained in the form of viscous solutions, granules, or emulsions.

It is furthermore also possible to carry out the polymerisation of the monomer compounds in the presence of substrates. For example, it can be carried out on glass fibre fabrics or textile material. In this case the respective substrate is advantageously impregnated with solutions or emulsions of the monomers and subsequently the polymerisation is effected by addition of a polymerisation catalyst by heating the material.

The preferred polymerisation processes are emulsion polymerisation in an aqueous medium and solvent polymerisation.

The polymerisation is preferably carried out with a reaction time that is so adjusted that a virtually quantitative conversion of the monomer into the polymer is attained. The maximum reaction time depends on the catalyst used and the polymerisation temperature and also on other conditions, but it is generally in the range from 0.5 to 24 hours.

The polymerisation temperature depends in turn on the chosen catalyst. In the case of emulsion polymerisation in aqueous medium it is in general in the range from 20° to 90°C. Whereever possible, the polymerisation is carried out at atmospheric pressure.

In the emulsion polymerisation, the monomer(s) to be polymerised is (are) polymerised jointly in an aqueous solution of an emulsifier under nitrogen to a given monomer concentration of about 5 to about 50%. Normally the temperature is raised to 40° to 70°c in order to effect the polymerisation in the presence if an added catalyst. The concentration of the polymerisation catalyst is generally between 0.1 and 2%, based on the weight of the monomers.

Suitable emulsifiers are cationic, anionic, or nonionic surfactants. The hydrophobic constituent of the emulsifier can be a hydrocarbon or fluorinated hydrocarbon.

Suitable cationic emulsifiers are for example quaternary ammonium salts, for example quaternary ammonium salts or amine salts that contain at least one long-chain alkyl or fluoroalkyl group, or a benzene or naphthalene group that is highly substituted with alkyl to yield the hydrophobic constituent.

Further suitable emulsifiers are the non-ionic surfactants in which the hydrophilic constituent is a poly(ethoxy) group and the hydrophobic constituent is either a hydrocarbon or a fluorinated hydrocarbon group, e.g. the ethylene oxide condensates of alkylphenols, alkanols, alkylamines, alkylthiols, alkylcarboxylic acids, fluoroalkylcarboxylic acids, fluoroalkylamides and the like. Anionic emulsifiers are for example the sulphuric acid or phosphoric acid esters of the cited ethylene oxide condensates of long-chain alkylphenols, fatty alcohols, and fatty amines.

In the solvent polymerisation, the monomer(s) is (are) dissolved in a suitable solvent, such as fluorinated solvents, for example hexafluoroxylene, benzotrifluoride, or mixtures thereof with acetone and/or ethyl acetate, and polymerised in a reaction vessel accompanied by the use of initiators such as azobisisobutyronitrile or other azo initiators, in concentration of 0.1 to 2%, at 40° to 100°C under nitrogen.

Preferred solvents are hexafluoroxylene, benztrifluoride, fluorine substituted halogenated hydrocarbons, other fluorinated solvents and the like.

As stated at the outset, valuable copolymers with other ethylenically unsaturated monomers are obtained in the polymerisation of the new monomers in addition to homopolymers.

The carboxylic acid perfluoroalkyl esters according to the invention can be used as such or preferably as homo- or copolymers for treating porous or non-porous substrates, preferably for producing oleophobic, hydrophobic, or dirt repellent finishes thereon. As porous substrates there may be mentioned leather and wood or especially fibre materials, such as textiles and paper. Possible non-porous substrates are chiefly metal, plastic, and glass surfaces.

The compounds according to the invention can also be used for example as additives for oils and lubricants for the prevention of wear and corrosion, or as additives for polishes and waxes.

Examples of textile materials that can be preferably treated with the monomeric or polymeric perfluoro compounds are those from natural or regenerated cellulose, such as cotton, linen, or rayon, staple fibre, or cellulose acetate. Also suitable are textiles made from wool, synthetic polyamides, polyester, or polyacrylonitrile. Blended fabrics or blended knitted fabrics from cotton/polyester fibres can also be finished with advantage. The textiles can be in the form of threads, fibres, flocks, fleeces, but preferably of woven or knitted fabrics, and can be used for example as articles of clothing, upholstery materials, decorating materials, and carpets.

Preparations that contain the monomer or polymer perfluoro compounds can be applied to the substrate in known manner.

The substrates are provided with an oil-repellent finish by treating them both with solutions, such as dispersions or emulsions of the monomer or polymer perfluoro compounds. The monomers can be applied e.g. from a solution in an organic solvent to the textile material and, after evaporation of the solvent, fixed on the fabric by heat. Polymers can be also be applied to the fabrics from suitable solvents.

Fabrics can be impregnated e.g. by the exhaustion process or on a padder that is coated with the preparation at room temperature. The impregnated material is then dried at 60° to 120°C and subsequently optionally subjected to a heat treatment at over 100°C, e.g. from 120° to 200°C, advantageously in the presence of known catalysts that donate acid.

Examples of further application methods are spraying, brushing, roll-coating, dusting with subsequent heat fixing or transfer of the polymers from an auxiliary material (paper, foil) accompanied by the application of heat. The compounds according to the invention are applied in amounts of 0.1 to 10, preferably 0.5 to 5, percent by weight based on the substrate.

It is also possible to apply still further agents to the substrates simultaneously with the compounds according to the invention, e.g. wetting agents, soft-handle agents, water repellents, paraffin wax emulsions, resin finishes, or agents that impart crease resistance.

Besides the oil-repellent effect that is attained with the compounds according to the invention it is also possible in particular to achieve soil-release and antisoiling effects on textile fibre substrates: monomers, and among the polymers especially the copolymers, in which the substituents $R_1$, $R_2$, or $R_3$ represents an alkoxy radical ($R'$-O), are particularly suitable for attaining these effects.

The following examples described the invention in more detail but are in no way limitative thereof. The parts and percentages are by weight unless otherwise stated.

EXAMPLES

A. Manufacture of the carboxylic acid perfluoroalkyl esters 1a. 4.97 g of 1-perfluorooctyl-2-chloroethanol and 1.42 g of triethylamine are dissolved in 25 ml of dry benzene. While stirring, a solution of 1.18 g of acrylic chloride in 10 ml of dry benzene is added within 15 minutes. The reaction mixture is allowed to react for 2 hours with stirring and the resulting precipitate is then filtered off. The filtrate is extracted with dilute sulphuric acid and then with dilute sodium bicarbonate solution. The benzene phase is subsequently dried over sodium sulphate and then fractionated, to yield 4.65 g (84.2% of theory) of the compound of the formula (101a) 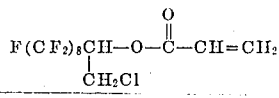

Boiling point: 54°C/0.001 Torr.
Analysis: calculated   C 28.3   H 1.1   Cl 6.4
          found        C 28.6   H 1.2   Cl 6.2
Molecular weight  calculated  553
                  found       540 b. The procedure as described in (1a) is carried out, but using fumaric dichloride. The fumaric acid diester of the formula (101b) 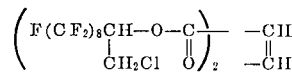

is obtained.

Melting point: 125°C (recrystallized from chloroform).
Analysis:: calculated   C 26.8   H 0.8   Cl 6.6
           found        C 26.9   H 0.9   Cl 6.6

2. 31 g of a 1-perfluoroalkyl-2-chloroethanol homologue mixture (only the principal components are indicated) of the formula (102) 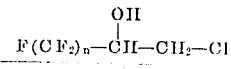

wherein
$n$ is 6, 8, 10,
mol% — 20.0, 50.2, 24.8, are reacted with 8.74 g of triethylamine and 7.25 g of acrylic chloride in accordance with (1). There are obtained 28.85 g (84.1% of theory) of a homologue mixture of the formula (103) 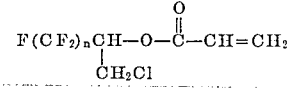

wherein
$n$ is 6, 8, 10,
mol% — 21.6, 48.6, 20.6
Boiling interval: 30° to 91°C/0.005 Torr.

3. 4.94 g of 1-perfluorooctyl-2-methoxyethanol and 1.42 g of triethylamine are dissolved in 25 ml of dry benzene. A solution of 1.18 g of acrylic chloride in 10 ml of dry benzene is added with stirring within 15 minutes. The precipitate is filtered off after 2 hours reaction time and processing is carried out as described in (1) to yield 4.6 g (84% of theory) of the compound of the formula (104) 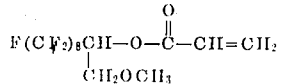

Boiling point: 57°C/0.001 Torr.
Analysis: calculated C 30.7 H 1.7
 found C 31.0 H 1.8
molecular weight: calculated 548
 found 557

The compound can be polymerised during long storage and yields colourless elastomers.

4. 18.7 g of a 1-perfluoroalkyl-2-methoxyethanol homologue mixture of the formula (105)    $F(CF_2)_nCH-OH$
               $|$
               $CH_2OCH_3$ $n$ is 6, 8, 10.
mol% — 23.1, 49.7, 22.5.
are reacted with 5.38 g of triethylamine and 4.46 g of acrylic chloride in accordance with (3) to yield 18.0 g (86.8% of theory) of a homologue mixture of the formula (106)    $F(CF_2)_nCH-O-\overset{\displaystyle O}{\underset{\displaystyle |}{C}}-CH=CH_2$
               $|$
               $CH_2OCH_3$ wherein
$n$ is 6, 8, 10.
mol% — 24.3, 50.3, 21.8
Boiling interval: 30°–100°C/0.001 Torr.

5. Proceeding in analogous manner to manufacturing instruction (3) the following acrylic esters are obtained from the following 1-perfluoroalkyl-2-alkoxy-alkanols and 1-perfluoroalkyl-2-aroxyalkanols (107)    $F(CF_2)_nCH-O-\overset{\displaystyle O}{\underset{\displaystyle |}{C}}-CH=CH_2$
               $|$
               $CH_2-O-R$

| | R | n | Boiling point | Yield % | Analysis |
|---|---|---|---|---|---|
| a) | n-$C_4H_9$ | 8 | 63°C/0.001 Torr | 76 | calc. C 34,6 H 2,6 found 34,9 2,7 |
| b) | n-$C_4H_9$ | 6+8+10 [1] | 53-103°C/0.002 Torr | 85,1 | |
| c) | -$CH_2CH_2OCH_3$ | 8 | 72°C/0.001 Torr | 81,3 | calc. C 32,5 H 2,2 M 592 found 32,9 2,2 615 |
| d) | $CH_2CH_2OCH_3$ | 6+8+10 | 103-143°C/11 Torr | 83,1 | |
| e) | -$C_6H_5$ | 8 | 101°C/0.001 Torr | 80,0 | calc. C 37,4 H 1,8 found 37,8 1,8 |
| f) | -$C_6H_5$ | 6+8+10 [2] | 91-127°C/0.001 Torr | 83,9 | |

[1] Molecular Composition $n$ = 6 (24,6%) 8 (50,2%) (23,4%)
[2] Molecular Composition $n$ = 6 (24,2%) 8 (47,6%) 10 (23,1%)

5 g. 4.97 g of 1-perfluorooctyl-2-chloroethanol are reacted with 1.42 g of triethylamine and 1.36 g of methacrylic chloride in analogous manner to Example 1. There are obtained 3.7 g (65% of theory) of the methacrylic ester (108)    $F(CF_2)_8-CH-O-\overset{\displaystyle O}{\underset{\displaystyle |}{C}}-\overset{\displaystyle CH_3}{\underset{\displaystyle |}{C}}=CH_2$
                  $|$
                  $CH_2Cl$ Boiling point: 59°C/0.002 mm Hg.
Analysis calculated C 29.7 H 1.4 Cl 6.3
 found C 30.4 H 1.4 Cl 6.4

B. Manufacture of the polymers

6a. A mixture of 10 parts of water, 0.25 part of N-dodecyltrimethylammonium chloride, 0.25 part of N-octadecyltrimethylammonium chloride, 9.8 parts of the ester according to (2), 0.2 part of N-methylolacrylic amide, 5 parts of acetone, and 0.05 part of 2 normal acetic acid, is vigorously stirred at 20°C for 20 minutes in a nitrogen atmosphere. Upon addition of 25 parts of water the mixture is heated to 60°c and treated with a solution of 0.025 part of potassium peroxide disulphate in 1.5 parts of water and a solution of 0.007 part of sodium metabisulphite in 1.5 parts of water. Ten minutes later there is again added a solution of 0.025 part of potassium peroxide disulphate in 1.5 parts of water and a solution of 0.007 part of sodium metabisulphite in 1.5 parts of water. A finely disperse, film-forming emulsion is obtained, which after 3 hours has a resin content of 19%, corresponding to a yield of about 100%.

b. In analogous manner to (a) the homologue mixture according to (4) is polymerised.

7. A mixture of 10 parts of water, 0.3 part of sodium lauryl sulphate, 5 parts of the ester according to (2), 4.8 parts of acrylic decyl ester, 0.2 part of N-methylolacrylic amide, and 5 parts of acetone, is stirred vigorously for 20 minutes at 20°c in a nitrogen atmosphere, Upon addition of 25 parts of water the mixture is heated to 60°C and treated with a solution of 0.025 part of potassium peroxide disulphate in 1.5 parts of water and a solution of 0.007 part of sodium metabisulphite in 1.5 parts of water. After 10 minutes there is again added a solution of 0.025 part of potassium peroxide disulphate in 1.5 parts of water and a solution of 0.007 part of sodium metabisulphite in 1.5 parts of water. A finely disperse film-forming emulsion is obtained, which after 3 hours has a resin content of 17%, corresponding to a yield of about 100%.

8. A mixture of 10 parts of water, 0.25 part of N-dodecyltrimethyl ammonium chloride, 5 parts of the compound of the formula 103, 4.8 parts of methacrylic octyl ester. 0.2 part of N-methylolacrylic amide, 5 parts of acetone, and 0.05 part of 2 normal acetic acid, is stirred vigorously for 20 minutes at 20°C. Upon addition of 25 parts of water the mixture is heated to 60°C and treated with a solution of 0.025 part of potassium peroxide disulphate in 1.5 parts of water and a solution of 0.007 part of sodium metabisulphite in 1.5 parts of water. After 10 minutes there is added again a solution of 0.025 part of potassium peroxide disulphate in 1.5 parts of water and a solution of 0.007 part of sodium metabisulphite in 1.5 parts of water. A finely disperse, film-forming emulsion is obtained, which after 3 hours has a resin content of 18%, corresponding to a yield of about 100%. The following emulsion copolymers are manufactured according to instruction 8.

| No. | Fluorine-containing monomer of the formula | Comonomer 1 | Comonomer 2 |
|---|---|---|---|
| 9 | 103 | acrylic acid-2-ethylhexyl ester | N-methylolacrylic amide |

Continued

| No. | Fluorine-containing monomer of the formula | Comonomer 1 | Comonomer 2 |
|---|---|---|---|
| 10 | 103 | methacrylic acid nonyl ester | do. |
| 11 | 103 | acrylic acid decyl ester | do. |
| 12 | 103 | methacrylic acid dodecyl ester | do. |
| 13 | 103 | methacrylic acid hexyl ester | do. |
| 14 | 107d | methacrylic acid nonyl ester | do. |
| 15 | 106 | methacrylic acid nonyl ester | do. |
| 16 | 103 | acrylic acid-n-butyl ester | do. |
| 17 | 106 | acrylic acid decyl ester | do. |
| 18 | 103 | acrylic acid hexyl ester | do. |

19a. A mixture of 10 parts of water, 0.25 part of dodecyltrimethylammonium chloride, 0.25 part of N-octadecyltrimethylammonium chloride, 7 parts of the compound of the formula 107f, 2.8 parts of acrylic acid decyl ester, 0.2 part of N-methylolacrylic amide, 5 parts of acetone, and 0.05 part of 2 normal acetic acid, is stirred vigorously for 20 minutes at 20°C. Upon addition of 25 parts of water the mixture is heated to 60°C and treated with a solution of 0.025 part of potassium peroxide disulphate in 1.5 parts of water and a solution of 0.007 part of sodium metabisulphite in 1.5 parts of water. After 10 minutes there is added again a solution of 0.025 part of potassium peroxide disulphate in 1.5 parts of water and a solution of 0.007 part of sodium metabisulphite in 1.5 parts of water. A finely disperse, film-forming emulsion is obtained, which after 3 hours has a resin content of 18%, corresponding to a yield of about 100%.

b. In analogous manner to (a), the compound of the formula 107b is polymerised instead of the compound of the formula 107f.

20a. A mixture of 25 parts of water, 0.5 part of N-dodecyltrimethylammonium chloride, 0.3 part of N-octadecyltrimethylammonium chloride, 10 parts of the compound of the formula 106, and 5 parts of acetone, is heated to 60°C and treated with a solution of 0.025 part of potassium peroxide disulphate in 1.5 parts of water and a solution of 0.007 part of sodium metabisulphite in 1.5 parts of water. After 30 minutes there is again added a solution of 0.025 part of potassium peroxide disulphate in 1.5 parts of water and a solution of 0.007 part of sodium metabisulphite in 1.5 parts of water. A finely disperse, film-forming emulsion is obtained, which after 3 hours has a resin content of 19%, corresponding to a yield of 96%.

b. In analogous manner to (a), the compound of the formula 107a is polymerised instead of the compound of the formula 106.

C. Application of the Polymers

1. Cotton fabrics and polyester/cotton fabrics (65/35) are impregnated with the polymer emulsions. The amount of polymer applied is 2% and 4% respectively, based on the weight of the substrate. The impregnating preparations contain additionally one part of magnesium chloride hexahydrate per litre.

The impregnated fabric is dried in the air and heat fixed for 4½ minutes at 150°C.

The finished fabrics are tested for their oil repellency according to the AATCC test procedure 118–1966T of the American Association of Textile Chemists and colorists (AATCC). The repellencies are between 0 and 8, with 8 being the best value. The resistance of the finishing is also tested by washing the fabrics at 60°C with an ordinary domestic detergent. The soilrelease properties are tested in the AATCC test procedure 130–1970 (Nujol Test), wherein nujol is applied at 40°C before each domestic wash.

Application liquor of the polymers:
20-140 parts of 15% emulsion of the polymers.
1 part of magnesium chloride hexahydrate
979–859 parts of water.

The oil-repellency and soil-release values obtained are given in the following table.

Table 1

| Polymer according to instruction | Amount of polymer in percent by weight (based on the fibre material) | Oil repellency on cotton fabrics | | |
|---|---|---|---|---|
| | | without washing | after 1 wash | after 5 washes |
| 6a | 4 | 5 | 3–4 | 3 |
| 6b | 2 | 3 | 3 | 2 |
|    | 4 | 5 | 5 | 5 |
| 7  | 4 | 5 | 5 | 5 |
| 8  | 4 | 7 | 6 | 6 |
| 9  | 4 | 6 | 6 | 6 |
| 10 | 2 | 2 | 2 | 1 |
| 11 | 2 | 6 | 6 | 6 |
| 12 | 2 | 2 | 2 | 2 |
| 13 | 2 | 4 | 4 | 4 |
| 14 | 2 | 3 | 3 | 3 |
| 15 | 2 | 5 | 5 | 5 |
| 16 | 2 | 4 | 4 | 3 |
| 17 | 2 | 5 | 5 | 5 |

Table 2

| polymer according to instruction | Amount of polymer in percent by weight (based on the fibre material) | Oil repellency on cotton fabrics | | |
|---|---|---|---|---|
| | | without washing | after 1 wash | after 5 washes |
| 6a | 4 | 4.5 | 4 | 3.5 |
| 6b | 2 | 2 | 2 | 2 |
|    | 4 | 5 | 5 | 4.5 |
| 7  | 4 | 5 | 5 | 4 |
| 8  | 4 | 6 | 6 | 5 |
| 9  | 4 | 6 | 6 | 5–6 |

Table 3

| Polymer according to instruction | Amount of polymer in percent by weight (based on the fibre material) | Soil-release on cotton fabrics | |
|---|---|---|---|
| | | after 1 wash | after 2 washes |
| 6b | 2 | 4,5 | 5 |
|    | 4 | 3 | 3,5 |

2. Fluorine-containing polymerisation products are applied with the following liquor:
20-140 parts of 15% emulsion of the polymers
50 parts of an aqueous preparation (50%) consisting of 1 mole of hexamethylolmelamine-hexamethyl ether and 1 mole of dimethylolethylene urea
8 parts of magnesium chloride hexahydrate
922-802 parts of water
1,000 parts Table 4 contains the results obtained of the oil repellency test:

Table 4

| Polymer according to instruction | Amount of polymer in percent by weight (based on fibre material) | Cotton | | | Polyester/cotton fabric | | |
|---|---|---|---|---|---|---|---|
| | | no wash | after 1 wash | after 5 washes | no wash | after 1 wash | after 5 washes |
| 6a | 4 | 5 | 4 | 4 | 5 | 4 | 4 |
| 6b | 2 | 4 | 4 | 4 | 4 | 4 | 4 |
| | 4 | 5 | 5 | 5 | 5 | 5 | 5 |
| 7 | 4 | 5 | 4 | 4 | 4 | 4 | 4 |
| 8 | 2 | 6 | 5–6 | 5–6 | 4 | 4–5 | 4 |
| | 4 | 7 | 6–7 | 6 | 6 | 6 | 6 |
| 9 | 2 | 5 | 4–5 | 4 | 4 | 4 | 4 |
| | 4 | 6 | 6 | 6 | 6 | 6 | 6 |
| 10 | 4 | 4 | 3 | 3 | 2 | 2 | 2 |
| 11 | 2 | 7 | 5–6 | 5 | 3–4 | 3 | 2 |
| | 4 | 7 | 6 | 6 | 6 | 6 | 5 |
| 12 | 4 | 3–4 | 3 | 3 | 2–3 | 2–3 | 2–3 |
| 13 | 2 | 5 | 4 | 3–4 | 3–4 | 3 | 2–3 |
| | 4 | 6–7 | 6 | 6 | 5 | 5 | 4 |
| 14 | 4 | 5 | 4–5 | 4–5 | 5 | 4–5 | 4–5 |
| 15 | 2 | 5 | 4 | 4 | 3–4 | 3 | 2–3 |
| | 4 | 6 | 5–6 | 5–6 | 6 | 5–6 | 5–6 |

We claim:

1. Carboxylic acid perfluoroalkyl esters corresponding to the formula

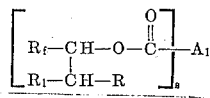

wherein $R_f$ represents a perfluorinated hydrocarbon radical with 1 to 22 carbon atoms, R represents hydrogen or methyl, $R_1$ represents chlorine or the radical $R_1'$-O-, in which $R_1'$ represents alkyl with 1 to 12 carbon atoms, cycloalkyl with 5 or 6 ring carbon atoms, alkoxyalkyl with 2 to 10 carbon atoms, the radical $-(CH_2CH_2O)_n-R'$, in which $R'$ represents alkyl 1 to 6 carbon atoms and $n$ is 1 or 2, or represents a phenyl radical or an alkylsubstituted phenyl radical with 1-4 carbon atoms in the alkyl chain, $A_1$ represents a hydrocarbon radical with 2 or 3 carbon atoms that is derived from monobasic, dibasic, or tribasic ethylenically unsaturated carboxylic acids, and $s$ is a whole number from 1 to 3.

2. Carboxylic acid perfluoroalkyl esters according to claim 1, wherein the perfluorinated hydrocarbon radical is a straight-chain or branched perfluoroalkyl radical with 4 to 17 carbon atoms.

3. Carboxylic acid perfluoroalkyl esters according to claim 1, which correspond to the formula

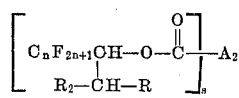

wherein R represents hydrogen or methyl, $R_2$ represents chlorine or the radical $R_2'$-O-, in which $R_2'$ represents alkyl with 1 to 6 carbon atoms, cyclohexyl, phenyl or alkoxyalkyl with 1 to 3 carbon atoms in the alkoxy moiety, $A_2$ represents an ethylenically unsaturated hydrocarbon radical that is derived from acrylic, methacrylic, crotonic, vinylacetic, fumaric, maleic, citraconic, mesaconic, itaconic, aconitic, or methylenemalonic acid, $n$ is a whole number from 4 to 14, and $s$ is a whole number from 1 to 3.

4. Carboxylic acid perfluoroalkyl esters according to claim 3, which correspond to the formula

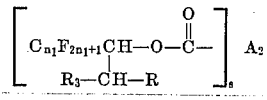

wherein R represents hydrogen or methyl, $R_3$ represents chlorine or the radical $R_3'$-O-, in which $R_3'$ represents alkyl with 1 to 6 carbon atoms, cyclohexyl, phenyl, or methoxyethyl, $n_1$ is a whole number from 6 to 12, and $A_2$ and $s$ have the meanings given in claim 3.

5. Carboxylic acid perfluoroalkyl esters according to claim 4, which correspond to the formula

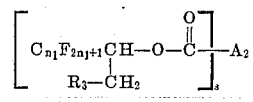

wherein $R_3$, $A_2$, $n_1$ and $s$ have the meanings given in claim 4.

6. Carboxylic acid perfluoroalkyl esters according to claim 3, which correspond to the formula

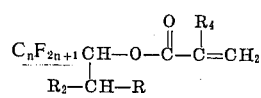

wherein R and $R_4$ represent hydrogen or methyl, and $R_2$ and $n$ have the meanings given in claim 3.

7. Carboxylic acid perfluoroalkyl esters according to claim 6, which correspond to the formula

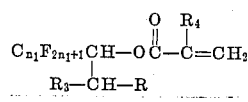

wherein R and $R_4$ represent hydrogen or methyl, and $R_3$ and $n_1$ have the meanings given in claim 4.

* * * * *